March 28, 1933.　　　　S. C. JESSUP　　　　1,903,183

MOWER BLADE

Filed May 22, 1931　　　　2 Sheets-Sheet 1

Inventor
Stephen C. Jessup

By Clarence A. O'Brien
Attorney

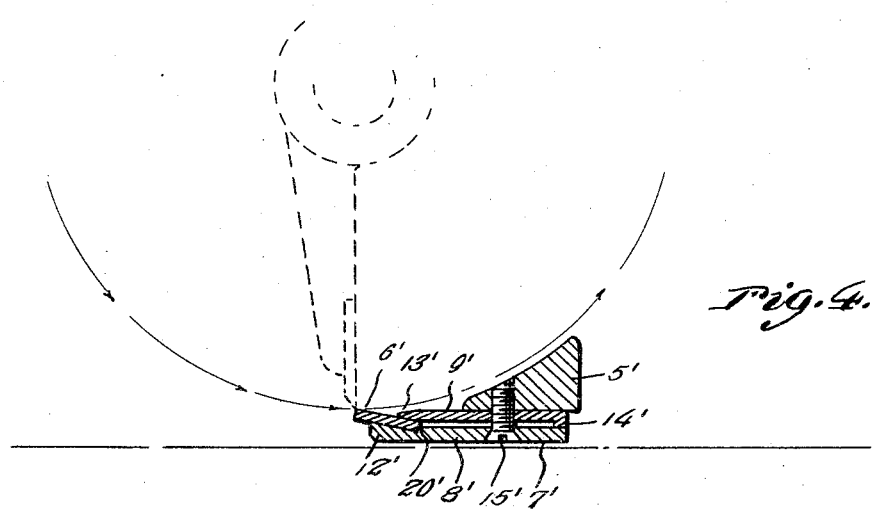
Fig. 4.
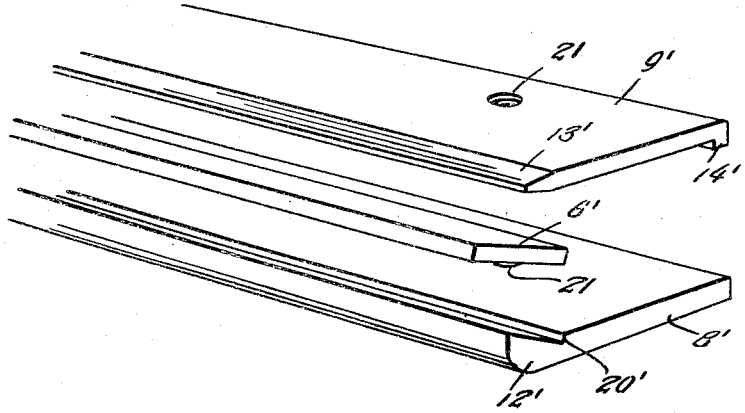
Fig. 5.
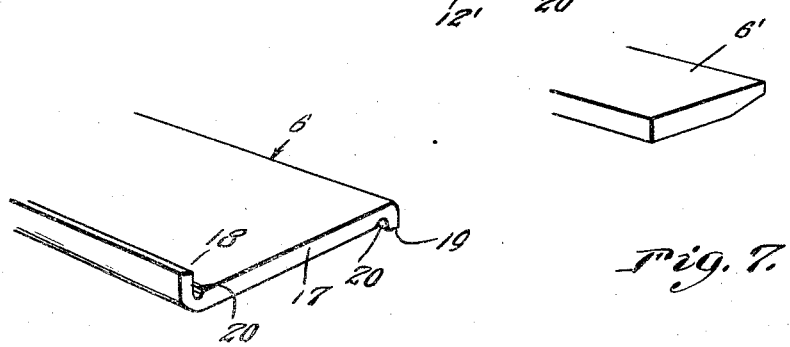
Fig. 7.
Fig. 6.
Inventor
Stephen C. Jessup
By Clarence A. O'Brien
Attorney Patented Mar. 28, 1933

1,903,183

UNITED STATES PATENT OFFICE

STEPHEN C. JESSUP, OF SALEM, OHIO

MOWER BLADE

Application filed May 22, 1931. Serial No. 539,355.

This invention appertains to new and useful improvements in blades for mowers, and more particularly to a blade especially adapted for machines used in cutting golf course greens.

The principal object of this invention is to provide a blade and blade holder for mower machines wherein the blade can be easily removed.

Another important object of the invention is to provide a blade and blade mount for mowers wherein the blade is provided with a plurality of cutting edges and being capable of being reversed in the holder to permit renewing of the cutting edge from time to time, without requiring the sharpening thereof with its consequential period of inactiveness for the machine.

Other important objects and advantages of the invention will be found in the following specification.

In the drawings:—

Fig. 4 represents a cross sectional view through a modified form of the invention.

Fig. 5 represents a fragmentary perspective view disclosing the elements of the modification in separated relation.

Fig. 6 represents a fragmentary perspective view showing the blade used in the preferred form of the invention with one edge worn.

Fig. 7 represents a fragmentary perspective view of the blade employed in the modified form of the invention with one cutting edge thereof worn.

Figure 1:
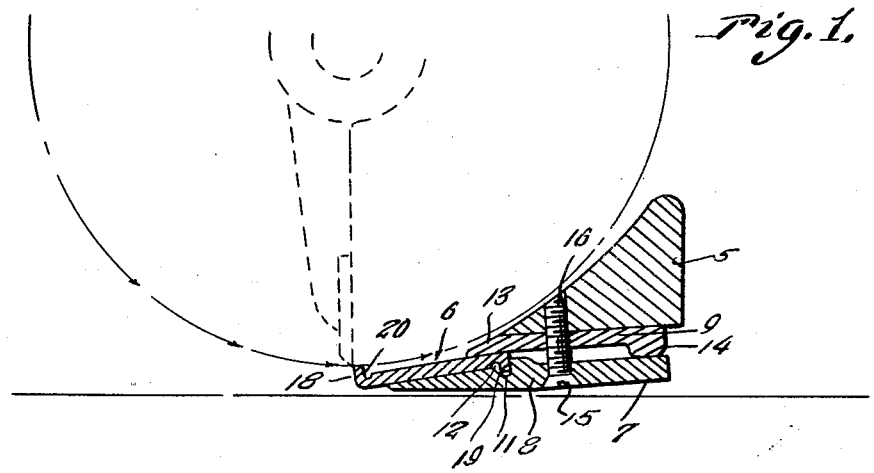
Figure 1 represents a cross sectional view through the novel blade and mount.

Referring to the drawings wherein like numerals designate like parts, it can be seen that numeral 5 represents the hanger bar to which the blades and mount are secured, the same preferably tapering across the section to the front edge thereof, in the manner shown in the drawings.

In carrying out the present invention, numeral 6 generally refers to the blade, while numeral 7 represents generally the holder. This holder is made up of the bottom section 8 and the top section 9, the lower section being substantially wider than the upper section and being provided with a shoulder 10 having a longitudinally extending channel 11 therein. The portion of the bottom section 8 between the shoulder 10 and the forward edge thereof is tapered transversely and upon the top surface of this section 8 immediately adjacent the channels 11 is the bead 12.

Figure 2:
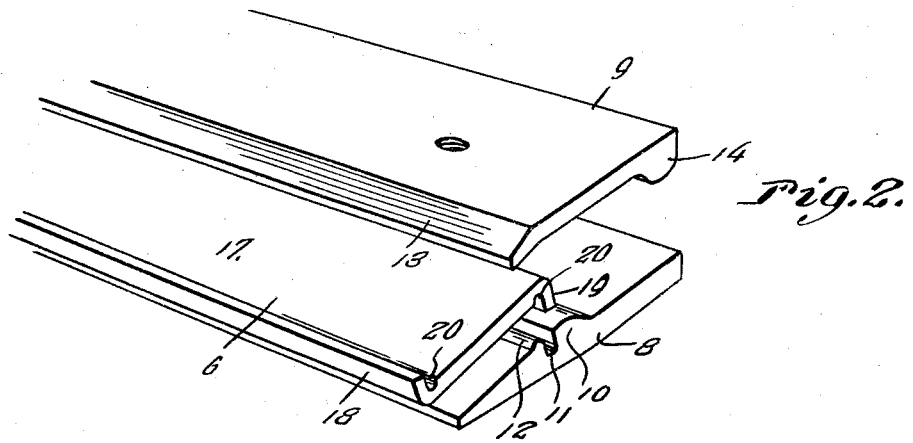
Fig. 2 represents a fragmentary perspective view disclosing the elements of the blade and mount in separated relation.
Figure 3:
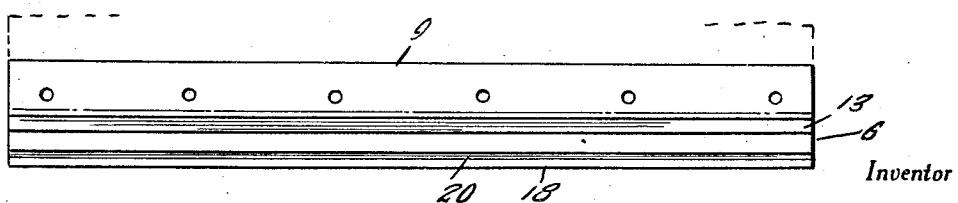
Fig. 3 represents a top plan view of the blade and mount assembly.

The upper section 9 has the longitudinal edge portion 13 slightly downwardly in the manner shown in Fig. 2, while its opposite longitudinal edge portion has a rib 14 at the bottom side which is adapted to bear against the corresponding edge portion of the section 8 in the manner shown in Fig. 4, when the slanting edge portion 13 is engaged against the blade 6. The sections 8 and 9 are provided with smooth registering openings through which the screw 15 is inserted, this screw being engaged into a threaded bore 16 in the suspension bar 5, so that by feeding the screw inwardly, the plate 8 will be tensioned so that considerable pressure will be exerted to clamp the blade 6 between the edge portion 13 of the upper section 9 and the tapering portion of the section 8.

The blade 6 is made up of an elongated plate 17 slightly wider than the distance between the channel 11 and the adjacent longitudinal edge of the section 8. One end of the plate 17 is provided with a relatively thin lateral extension 18, which is clearly shown in Fig. 6. The opposite end is also provided with a relatively thin extension 19 disposed laterally beyond the opposite sides of the plate 17 from the extension 18.

Each side of the plate 17 is provided with a longitudinally extending groove 20 adjacent its corresponding extension 18 or 19.

It can thus be seen that one of these extensions 18 or 19 will engage in the channel 11 of the section 8, while the bead 12 will engage in the adjacent groove 20, so that when the sections are snugly together, the blade 6 cannot become displaced from the mount. Obviously, when the extension 18 wears down so that it is no longer serviceable, the blade is inverted and the inner extension 19 is employed.

It will be observed that the extension 18 will not wear down to such an extent that a portion thereof will not be efficient in engaging behind the bead or into the channel 11 to prevent displacement of the blade from the holder.

Figs. 4, 5 and 7 show a modification of the invention wherein 5' represents the suspension bar to which the upper and lower sections 9' and 8' of the holder generally referred to by numeral 7' are secured.

As shown in Fig. 5, the lower section 8' is provided at one longitudinal edge portion with an outwardly flaring enlargement 12' merging at its inner end with the shoulder 20'. When the upper section 9' is provided with a depending rib 14', at one longitudinal edge portion thereof, its opposite longitudinal edge portion is tapered as at 13'.

The blade 6' is of uniform thickness throughout and is of sufficient width to have one longitudinal edge portion projecting beyond the enlarged edge portion 12' of the section 8' and the inner edge portion engaging the shoulder 20'. With the blade 6' so positioned and with the section 9' resting upon the blade 6' and the section 8', a screw 15' disposed through the smooth openings 21 in the sections 8' and 9' and threaded into the bar 5' will serve to tensionally urge the section 8' firmly clamp the blade 6' between the said section 8' and the section 9'.

Obviously, when it is desired that the blade 6' be inverted or changed so as to use another corner thereof, the screw 15' is loosened so that the blade can be easily disengaged from between the sections 8' and 9' and again inserted with equal ease.

Fig. 7 shows the blade 6' with one corner thereof worn off, and when the blade becomes so worn, it is highly desirable that the blade be inverted or turned around so that a new corner can be used as the increased surface due to wear increases the friction of the mower reel which not only makes the machine difficult to operate, but also lessens the efficiency of the machine.

It can be seen that a blade and blade mount constructed in accordance with the foregoing specification will be highly desirable for use in cutting the grass on golf course greens, where the grass must be closely cropped.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. In a structure of the class described, a mower blade having an elongated body abruptly reduced at each longitudinal edge portion thereof to define shoulders and extensions less in thickness than the thickness of the major portion of the body, said extensions being extended upwardly and downwardly respectively in spaced parallel relation to said shoulders to cooperate with the shoulders in the formation of grooves immediately in back of the extensions, and clamping plates engaging the upper and lower surfaces of said body, one of said clamping plates having a groove therein for the insertion of one of the extensions.

2. In a structure of the class described, a pair of upper and lower plates, the lower plate being thickened at the intermediate portions thereof and provided with a groove defining a pair of ribs, a blade between said plates and having a depending rib inserted in said groove and being provided with a groove receiving one of the ribs of the lower plate, the rear portion of the upper plate being provided with a depending rib engaging the rear portion of the lower plate, and a clamping device extending through said upper and lower plate, the lower plate being provided with an extension underlying said blades and flatly engaging the under side of the same.

In testimony whereof I affix my signature.
STEPHEN C. JESSUP.